(12) United States Patent
Quix et al.

(10) Patent No.: US 10,378,425 B2
(45) Date of Patent: Aug. 13, 2019

(54) SYSTEMS AND METHODS FOR A COOLING SYSTEM OF A VEHICLE ENGINE

(71) Applicant: Ford Global Technologies, LLC, Dearborn, MI (US)

(72) Inventors: Hans Guenter Quix, Herzogenrath (DE); David van Bebber, Aachen (DE); Andreas Schmitt, Aachen (DE); Claudia Herudek, Aachen (DE); Klaus-Peter Heinig, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/915,944

(22) Filed: Mar. 8, 2018

(65) Prior Publication Data
US 2018/0274429 A1 Sep. 27, 2018

(30) Foreign Application Priority Data
Mar. 22, 2017 (DE) .......................... 10 2017 204 824

(51) Int. Cl.
| | |
|---|---|
| *F01P 7/16* | (2006.01) |
| *F01P 3/20* | (2006.01) |
| *F01P 11/20* | (2006.01) |
| *F01P 11/02* | (2006.01) |
| *B01D 61/36* | (2006.01) |

(Continued)

(52) U.S. Cl.
CPC .................. *F01P 7/16* (2013.01); *F01P 3/20* (2013.01); *F01P 11/20* (2013.01); *B01D 61/025* (2013.01); *B01D 61/362* (2013.01); *F01P 11/029* (2013.01); *F01P 2003/003* (2013.01); *F01P 2005/105* (2013.01); *F01P 2005/125* (2013.01); *F01P 2007/146* (2013.01); *F01P 2025/13* (2013.01); *F01P 2025/80* (2013.01); *F01P 2060/08* (2013.01)

(58) Field of Classification Search
CPC .. F01P 7/14; F01P 11/02; F01P 11/029; F01P 2025/80
See application file for complete search history.

(56) References Cited

U.S. PATENT DOCUMENTS

| | | | |
|---|---|---|---|
| 3,661,200 | A | 5/1972 | McNamara |
| 4,513,696 | A | 4/1985 | Fujii et al. |

(Continued)

FOREIGN PATENT DOCUMENTS

| | | |
|---|---|---|
| CN | 201050401 Y | 4/2008 |
| CN | 104929752 A | 9/2015 |

(Continued)

*Primary Examiner* — Long T Tran
(74) *Attorney, Agent, or Firm* — Julia Voutyras; McCoy Russell LLP

(57) ABSTRACT

Methods and systems are provided for a cooling system for a vehicle engine. In one example, the cooling system includes a coolant solution circulated through both an engine cooling circuit and a vehicle interior heating circuit that is fluidly coupled to the engine cooling circuit, and a reservoir containing concentrated antifreeze. The concentrated antifreeze is flowed from the reservoir to the vehicle interior heating circuit via a shutoff valve to increase a concentration of antifreeze in the coolant solution. In some embodiments, a separation unit may be used to decrease the concentration of antifreeze in the coolant solution.

19 Claims, 9 Drawing Sheets

(51) Int. Cl.
*F01P 3/00* (2006.01)
*F01P 7/14* (2006.01)
*B01D 61/02* (2006.01)
*F01P 5/10* (2006.01)
*F01P 5/12* (2006.01)

(56) References Cited

U.S. PATENT DOCUMENTS

| | | | | |
|---|---|---|---|---|
| 4,622,925 | A | * | 11/1986 | Kubozuka ............. F01P 3/2271 |
| | | | | 123/41.25 |
| 4,662,318 | A | * | 5/1987 | Hayashi ................. F01P 11/18 |
| | | | | 123/41.21 |
| 4,664,073 | A | * | 5/1987 | Hirano ................... F01P 11/18 |
| | | | | 123/41.21 |
| 4,766,852 | A | * | 8/1988 | Hirano ..................... F01P 3/22 |
| | | | | 123/41.21 |
| 5,263,885 | A | | 11/1993 | Montague |
| 5,511,590 | A | * | 4/1996 | Turcotte .............. F01P 11/0204 |
| | | | | 134/169 A |
| 5,518,047 | A | * | 5/1996 | Alexandrowski .... F01P 11/0276 |
| | | | | 141/59 |
| 5,571,420 | A | * | 11/1996 | Creeron ................... F01P 11/00 |
| | | | | 123/41.14 |
| 6,230,669 | B1 | * | 5/2001 | Evans ....................... F01P 3/22 |
| | | | | 123/41.42 |
| 8,851,026 | B2 | | 10/2014 | Brinkmann et al. |
| 2004/0224201 | A1 | * | 11/2004 | St-Pierre .................. F01P 11/06 |
| | | | | 429/438 |
| 2009/0159019 | A1 | * | 6/2009 | Hutchins ............... F01P 11/029 |
| | | | | 123/41.01 |

FOREIGN PATENT DOCUMENTS

| | | |
|---|---|---|
| DE | 19607638 C1 | 6/1997 |
| DE | 19948160 A1 | 4/2001 |
| DE | 102010017766 A1 | 1/2012 |
| DE | 102011121519 A1 | 6/2013 |
| JP | H08185877 A | 7/1996 |
| KR | 1019990017880 | 3/1999 |
| KR | 1019990051956 | 7/1999 |
| KR | 100250041 B1 | 4/2000 |

* cited by examiner

SYSTEMS AND METHODS FOR A COOLING SYSTEM OF A VEHICLE ENGINE

CROSS REFERENCE TO RELATED APPLICATION

The present application claims priority to German Patent Application No. 102017204824.7, filed Mar. 22, 2017. The entire contents of the above-referenced application are hereby incorporated by reference in its entirety for all purposes.

FIELD

The present description relates generally to methods and systems for cooling a vehicle engine.

BACKGROUND/SUMMARY

Internal combustion engines may be efficiently cooled by circulating a coolant through an engine block to extract heat to reduce a temperature of the engine block. The coolant is generally an aqueous solution of (mono) ethylene glycol (ethane-1,2-diol), e.g., antifreeze, thereby forming a mixture with a depressed freezing point relative to pure water. The use of water-based liquids with low freezing points as a heat-dissipating medium may prevent burst damage caused by the expansion of water as it freezes at temperatures below 0° C. After extracting heat from the engine block, the coolant may be flowed through a vehicle interior heating circuit to transfer heat to a heat exchanger that then uses the heat to warm a vehicle interior.

However, the inventors herein have recognized potential issues with the use of an antifreeze solution. As one example, although degradation of engine components due to expansion of water upon freezing may be effectively reduced if the concentration of the antifreeze solution in the coolant is sufficiently high, a higher percentage of ethylene glycol may decrease a heat capacity of the mixture since pure water has a higher heat capacity. Also, larger heat exchangers and greater rates of flow therethrough may be demanded due to a higher viscosity of ethylene glycol. By reducing the concentration of ethylene glycol in the coolant, smaller heat exchangers (for example, a vehicle radiator) and/or smaller rates of flow through the heat exchanger may be allowed thereby decreasing hydraulic losses so that a smaller pump capacity within the cooling system may be sufficient to dissipate the heat.

Furthermore, conventional antifreeze solutions used for internal combustion engines may comprise 50% water and 50% ethylene glycol with a freezing point of approximately −40° C. Such low temperatures are observed in sparsely populated parts of the world and/or for a short period over the space of a year, so that the use of such an antifreeze solution all year round does not improve cooling efficiency more than an antifreeze solution of a lower concentration of ethylene glycol. In addition, in climates where ambient temperatures are high, coolant containing ethylene glycol may not be desired.

Other attempts to address cooling systems with antifreeze solutions of higher ethylene glycol content than desired for efficient engine cooling include various methods for adjusting the concentration of ethylene glycol in the coolant. One example approach is shown by Lee in KR 101999017880. Therein, a fixed apparatus for automatically controlling a concentration of an antifreeze is described. The fixed apparatus is provided in order to improve productivity on an assembly line and to increase an efficiency of vehicle production by installing a control antifreeze tank to control and mix an antifreeze with water by a flow rate control valve and a water level control valve. The apparatus comprises an operating part for inputting a concentration value of the antifreeze based on the climatic conditions of an export area, a control unit for calculating a mixture of antifreeze and water relative to the input concentration value, a flow rate control valve and a water level control valve for discharging and controlling the mixture of antifreeze and water fed from an antifreeze tank and a water supply tank via the control unit, and a control antifreeze tank for storing the antifreeze mixture which is mixed from the antifreeze and the water.

In another example by Fujii et al in U.S. Pat. No. 4,513,696, a fixed, compact apparatus for charging a cooling liquid with a desired antifreeze concentration is included in an engine cooling system. The apparatus comprises an additional reservoir for storing an additive, such as an antifreeze solution, for example, a cooling water reservoir for storing cooling water, and a filler head, which is configured to connect to a coolant inlet of a cooling system of a motor vehicle engine with additional pipes extending between the additional reservoir and the filler head, and cooling water pipes between the cooling water reservoir. Additional control valves are provided in the additional pipes in order to control the quantity of the additive delivered to the engine cooling system according to the capacity of the cooling system and a desired concentration of the additive. Cooling water control valves are also provided in the cooling water pipes, in order to control the quantity of cooling water delivered to the engine cooling system according to the capacity of the cooling system and the desired concentration of the additive. The engine cooling system is thereby charged with cooling water containing the additive in the desired concentration.

Methods for addressing the issue of controlling coolant composition may also include internal devices on a vehicle to vary a concentration of antifreeze in an antifreeze solution or to alleviate other disadvantages of a cooling system having a high concentration of antifreeze. One example approach is shown by Park in KR 1999051956. Therein, an apparatus for automatically supplying an antifreeze solution of a vehicle and a control method to prevent a radiator and a cylinder block from being frozen and degraded is disclosed. The apparatus for automatically supplying an antifreeze solution of a vehicle comprises a vessel for storing antifreeze solution, on which an outlet opening is formed, which delivers the antifreeze solution to an underside of the vessel and which is fixed at a predefined position inside an engine hood of the vehicle. The apparatus further comprises a supply pipe, which is connected to a radiator, which contains coolant and is connected to the outlet opening, in order to deliver the antifreeze solution to the radiator. An opening and closing valve is fitted to the supply pipe in order to open and close a passage of the supply pipe. An outside temperature sensor registers the outdoor air temperature. A control unit opens and closes the opening and closing valve on the basis of a signal from the outside temperature sensor.

Another example is shown in KR 100250041 where a method is described for controlling the density of an antifreeze solution, in order to automatically control a density of the antifreeze solution as a function of the temperature of the outside air by increasing and reducing a quantity of cooling water via a centrifugal motor, and to deliver the antifreeze solution from a chamber. A density sensor measures the density of the antifreeze solution in a vehicle radiator. A control unit receives an input signal in the form of a signal from a temperature sensor, which registers the temperature of the outside air, and compares the density of the antifreeze solution and the temperature of the outside air with a predetermined logic. A control signal emitted by the control unit drives the centrifugal motor of a radiator reservoir tank to allow cooling water to flow out of the radiator. An antifreeze solution supply motor or a cooling water supply motor is driven to automatically deliver the antifreeze solution or the cooling water.

As another example, CN 104929752 discloses an adjusting device and a method of adjusting a liquid antifreeze of a cooling system of a turbocharged engine in order to decrease emission of loud flow noises, which in certain driving conditions are generated through the need to provide cooling liquid for the turbocharged engine. The adjusting device comprises a body control module (BCM), a relay and an open solenoid valve, the open solenoid valve being connected to a pipeline between a thermostat and a heat exchanger of the engine cooling system. The BCM is connected to one end of a coil of the relay. The other end of the coil of the relay is connected to a power supply B+. One end of a switch of the relay is connected to the power supply B+, the other end of the switch of the relay is connected to one end of the open solenoid valve. The other end of the open solenoid valve is grounded. The BCM collects an engine cooling water temperature signal, an engine speed signal and a vehicle speed signal and outputs signals after internal computation. An opening/closing of the open solenoid valve is controlled by the relay, in order to adjust the liquid antifreeze. The adjusting device and the method of adjustment serve effectively to prevent a noise from the liquid antifreeze flowing into the heat exchanger and to improve the ride comfort in a passenger compartment.

As another example, CN 201050401 describes an alternative solution to reducing degradation of engine components due to expansion of water upon freezing at outside temperatures below 0° C. This describes an antifreeze regulating device of a radiator which is matched to the radiator. The antifreeze regulating device is situated in a closed, hollow reservoir structure, one or more pores being arranged on the bottom. The entire device is arranged in a water lower water storage chamber of the radiator. The device is fixed on the underside of the lower water storage chamber by means of a fixing plate, two ends being closed. When the radiator is completely filled with cooling water and the water temperature increases, the volume of air enclosed in the antifreeze regulating device expands in order to reduce an ingress of cooling water from the lower water storage chamber. If the ambient temperature drops below 0° C., the air is cold and the volume of air contracts, the water is frozen and the volume is increased through the pores into the antifreeze regulating device, thereby reducing any expansion of the radiator due to the frozen water. The water storage structure of the radiator is therefore protected from a forced expansion.

As another example, U.S. Pat. No. 5,263,885 describes a device (electronic Winterizer"), which is installed in an interior of a boat. It winterizes an inboard/outboard engine without the involvement of a skilled person. The winterizing may be performed in or out of the water. The device allows a boat owner to operate his inboard/outboard engine in cold temperatures without each time having to ask a person to winterize the engine. The boat may thereby be used throughout the winter. To operate the device, the inboard/outboard engine is first started. Once the engine has reached a suitable temperature the thermostat is opened. While the engine is running, the operator operates a switch which is mounted on the dashboard of the control cabin. The switch activates an electronic timer that switches on a DC-powered valve and a pump. The instant it is switched on the valve opens and the pump starts. The pump pumps antifreeze from a storage tank, which is likewise installed inside the boat. The pump delivers antifreeze through the open valve into the injector. The injector is fitted in a hose, which provides coolant to the engine and the driveshaft. The antifreeze flows through the injector at an angle such that it mixes the antifreeze and the cooling water in a suitable ratio that prevents the unit from freezing.

However, the inventors herein have recognized potential issues with such systems. As one example, a size of the cooling system in the systems described above, including a tank for water and an additional tank for coolant, may occupy a large volume of space in a front compartment of a vehicle. In particular, heat exchangers may be bulky and impose space constraints on a positioning of other vehicle components. Pumping of the aqueous antifreeze mixture may also levy high hydraulic forces and drive torque at a water pump of the vehicle. Furthermore, once mixed, a concentration of antifreeze in the coolant mixture may not be reduced in response to an increase demand for cooling capacity. This may result in coolant mixtures with an undesirably high amount of antifreeze that results in increased loading on the water pump. If recirculation of the aqueous antifreeze mixture is not desired, the mixture may have to be stored onboard.

In one example, the issues described above may be addressed by a cooling system of a vehicle engine, comprising an engine cooling circuit, containing a coolant solution, and a vehicle interior heating circuit fluidly coupled to the engine cooling circuit, where a reservoir for receiving a concentrated antifreeze and a shutoff element, arranged in the flow between the reservoir and the vehicle interior heating circuit, are provided, and where the shutoff element serves to establish a flow connection between the reservoir and the vehicle interior heating circuit in at least one operating state of the cooling system. In this way, the size of the cooling system and hydraulic forces applied to pumping the coolant may be reduced.

As one example, the engine cooling circuit contains a liquid coolant and a vehicle interior heating circuit is fluidly coupled to the engine cooling circuit. A reservoir for receiving the concentrated antifreeze is provided and a shutoff element is arranged in a flow path between the reservoir and the vehicle interior heating circuit. The shutoff element may fluidly couple the reservoir to the vehicle interior heating circuit in at least one operating state of the cooling system. A separation unit may be provided for separating antifreeze out of the coolant solution of the engine cooling circuit. The separation unit may be fluidly coupled on an inlet side to the engine cooling circuit and on an outlet side to the reservoir and return the separated components of the coolant solution to individual tanks for each components. In this way, coolant solution and ethylene glycol may be recycled within the cooling system, reducing refilling events and storage of waste antifreeze solutions onboard. The cooling system may effectively decrease a likelihood of the coolant solution freezing and/or reduce a pump capacity for dissipating the heat. The use of a smaller heat exchanger and/or pipes of smaller diameter may be allowed as a result. As well, the concentrated antifreeze solution may be introduced into the engine cooling circuit via the vehicle interior heating circuit, so that existing systems may be retrofitted with the said cooling system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
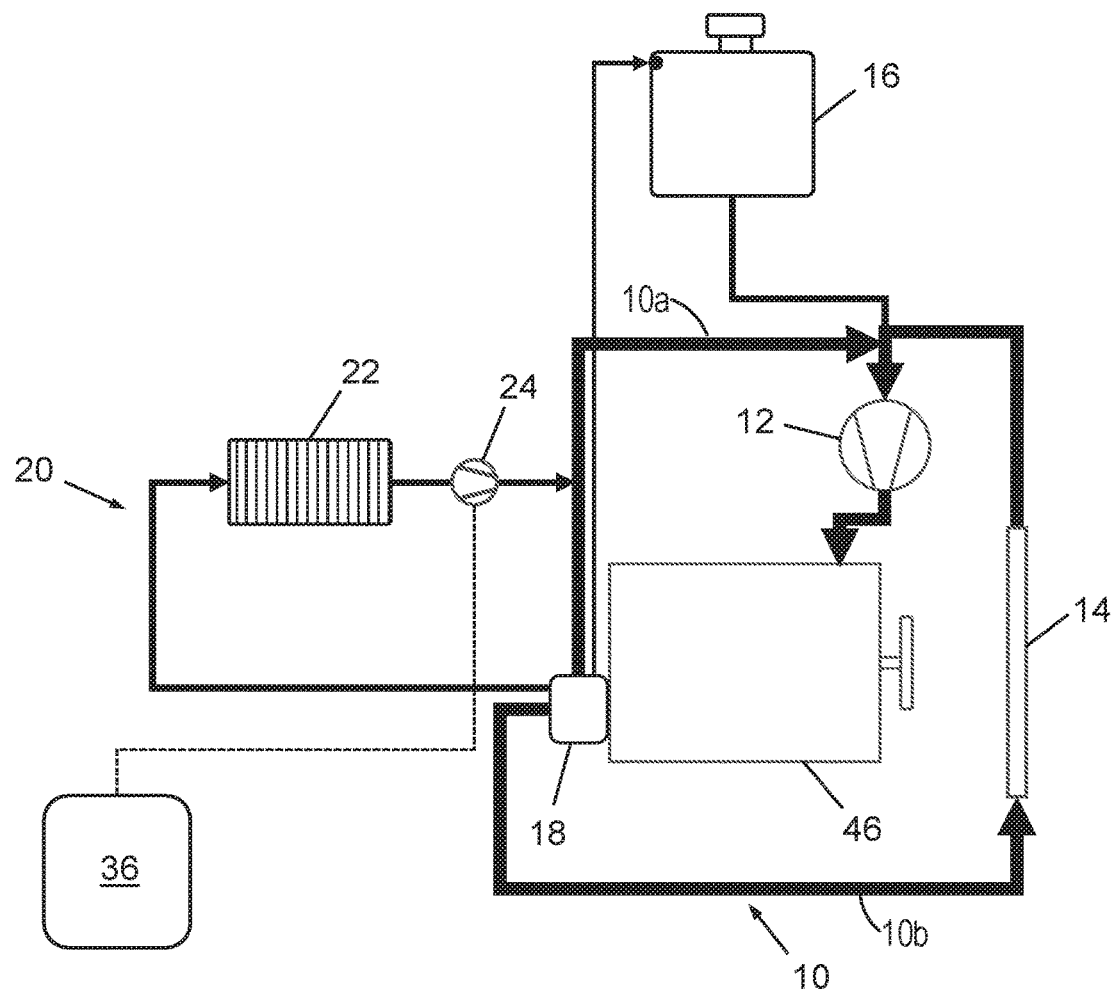
FIG. 1 shows a conventional embodiment of a cooling system in an engine.
Figure 2:
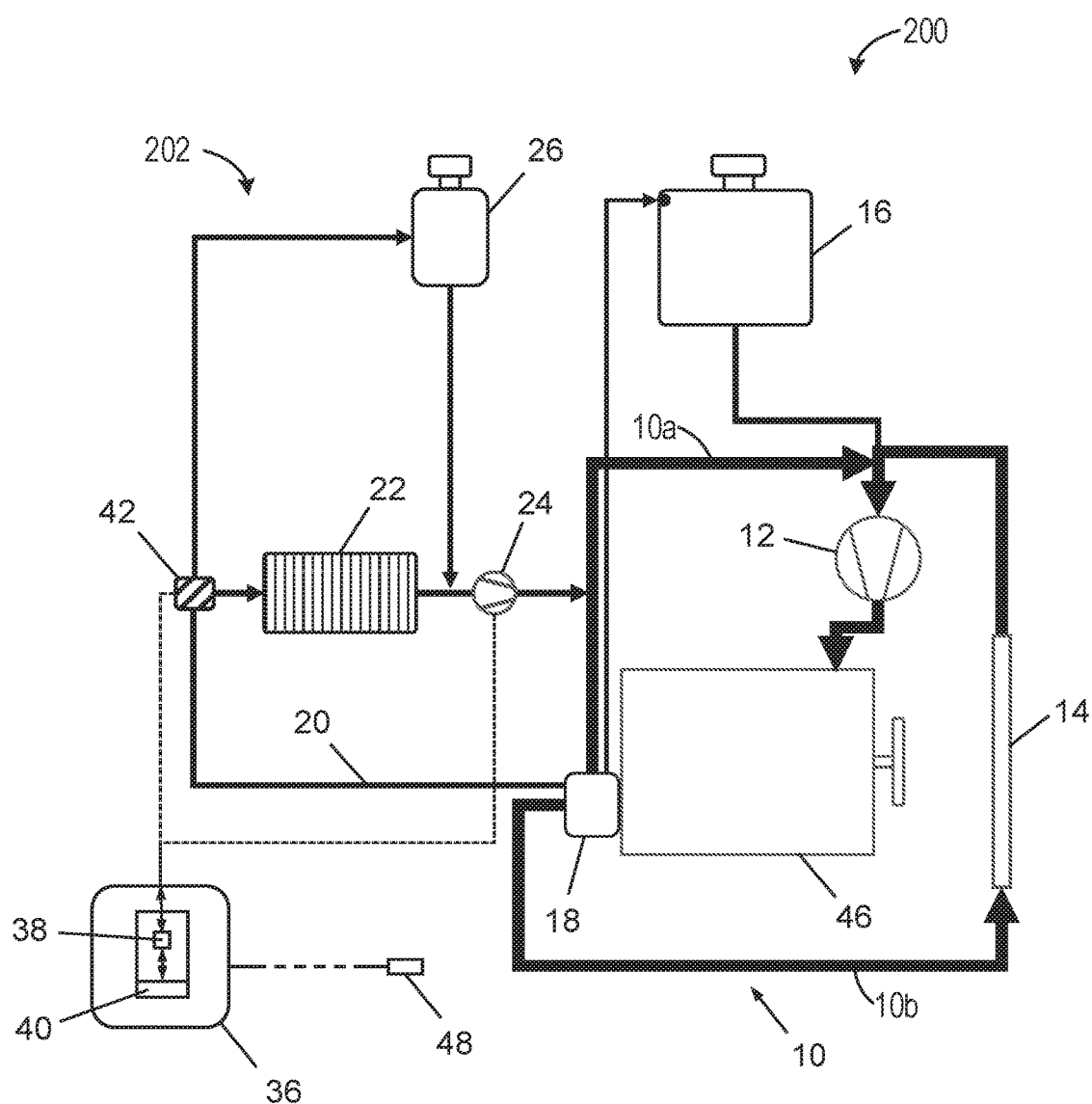
FIG. 2 shows a first embodiment of a cooling system in an engine adapted to produce a desired antifreeze concentration.

The following description relates to systems and methods for a vehicle engine cooling system which may effectively reduce degradation of engine components arising from expansion of aqueous coolant solutions upon freezing and may allow a use of smaller heat exchangers and/or pipes of smaller diameter as well as a reduction in the demands placed on a coolant pump. A conventional cooling system is shown in FIG. 1, including a cooling circuit coupled to a vehicle interior heating circuit. A first embodiment of a cooling system adapted with a tank for holding concentrated antifreeze, e.g., ethylene glycol, separate from a tank containing a coolant solution is shown in FIG. 2. Amounts of coolant and antifreeze solutions may be mixed to provide a desired concentration of antifreeze, cooling capacity, and freezing point depression of the resulting coolant solution. Alternate embodiments of a cooling system, adapted with separate tanks of coolant and concentrated antifreeze for controlled mixing, are shown in FIGS. 3-7, including an addition of a separation unit, variations in a position of the coolant tank and other devices for controlling mixing of the concentrated antifreeze with the coolant solution. Methods for adjusting the concentration of antifreeze in the coolant solution are shown in FIG. 8A for increasing the concentration and in FIG. 8B for decreasing the concentration, based on inputs including ambient temperature, a radio signal, and a user operated switch. An example routine for adjusting the antifreeze concentration in the coolant solution in response to changes in ambient temperature is shown in FIG. 9.

A conventional cooling system 100 of a vehicle engine 46, which may be an internal combustion engine, is shown in FIG. 1. The conventional cooling system 100 comprises an engine cooling circuit 10, and contains a coolant solution which may be a 50% solution of ethylene glycol in water as well as additives, for example, for reducing corrosion. The engine cooling circuit includes a coolant pump 12, a radiator 14, the engine 46, and a first thermostatic valve 18. The coolant solution may be circulated along two paths, including a first path 10a that includes the first thermostatic valve 18, the coolant pump 12, and the engine 46. A second path 10b comprises the thermostatic valve 18, the radiator 14, the coolant pump 12, and the engine 46. The coolant pump 12 may be driven by the engine 46 and may pump the coolant solution through the engine cooling circuit 10. The radiator 14 may be a heat exchanger for dissipating engine heat to the outside air.

A flow of the coolant solution through the engine cooling circuit 10 is regulated by the first thermostatic valve 18 arranged on the engine 46 and directly in the flow of the coolant solution. The first thermostatic valve 18 may be configured with dual channels so that a flow between the first path 10a and the second path 10b may be controlled. For example, when a temperature, measured by an engine coolant temperature (ECT) sensor arranged in the engine 46 (not shown in FIG. 1), of the engine 46 is below a desired operating temperature, a coolant path through the vehicle radiator 14 may be closed by the first thermostatic valve 18, and the coolant pump 12 may pump the coolant solution from the engine 46 directly back to the coolant pump 12. If the coolant temperature exceeds a preset temperature value of approximately 75° C., for example, the first thermostatic valve 18 may close the direct return to the coolant pump 12 and open the coolant path through second path 10b of the engine coolant circuit 10, to flow the coolant through the vehicle radiator 14 to the coolant pump 12.

The conventional cooling system 100 may further comprise a vehicle interior heating circuit 20 that includes a vehicle interior heat exchanger 22 and an electrically operated pump 24 for pumping the coolant through the vehicle interior heat exchanger 22. The electrically operated pump 24 may be actuated by an electronic control unit 36. The electronic control unit 36 may be an electronic processing unit having at least one electronic control loop and/or at least one electronic control circuit. The cooling circuit 10 may be coupled to the interior heating circuit 20 at the first thermostatic valve 18. Thus, heat absorbed by the coolant solution that is not dissipated by the radiator 14 may be circulated through the interior heating circuit 20 to be exchanged at the heat exchanger 22 to heat an interior of the vehicle. The coolant solution may be stored in an expansion tank 16 that receives circulating coolant solution from the interior heating circuit 20 and engine cooling circuit 10 at an inlet of the tank and flows the coolant solution to the engine cooling circuit 10 at an outlet of the tank.

In the cooling system 100 of FIG. 1, the concentration of antifreeze in the coolant solution may not be adjusted. As a result, the cooling system may be adapted to reduce a likelihood of the solution freezing and expanding during infrequent occurrences of exceptionally low ambient temperatures. In other words, the concentration of coolant may be higher than desired for most operating conditions experienced by the engine. This may impose hydraulic forces on the coolant pump, e.g., water pump that reduces a usable lifetime of the coolant pump. This issue may be addressed by configuring the cooling system with separated reservoirs containing concentrated antifreeze and a dilute coolant solution that may be mixed to provide a coolant solution with customizable cooling capacity and freezing point depression.

A first embodiment of a cooling system 200 adapted to adjust a concentration of antifreeze in a coolant solution for cooling the engine 46 is depicted in FIG. 2. The cooling system 200 may be similarly configured to the cooling system 100 of FIG. 1 but additionally includes a coolant mixing circuit 202 that couples a reservoir 26 storing a concentrated antifreeze to the interior heating circuit 20. The concentrated antifreeze may refer to a concentration of at least 70-90% by volume of antifreeze, e.g., ethylene glycol, in water.

Elements in common with those of the cooling system 100 of FIG. 1 are similarly numbered and will not be re-introduced. The cooling system 200 may be configured with the expansion tank 16 configured to store coolant solution and the reservoir 26 configured to store concentrated antifreeze, e.g., ethylene glycol, and a system for mixing the coolant solution with the antifreeze in controlled proportions to form a mixture with desired cooling capacity and freezing point depression. Small increases in coolant concentration may be provided by the cooling system 200 with negligible changes in coolant volume.

The reservoir 26 may be included in the coolant mixing circuit 202 where the coolant solution, circulated through the engine cooling circuit 10 and the interior heating circuit 20, may flow into the coolant mixing circuit 202 through a controllable shutoff valve 42. A coupling of the coolant mixing circuit 202 to the interior heating circuit 20 by adding the shutoff valve 42, the reservoir 26, and connecting coolant lines may allow for simple retrofitting of the cooling system 200 to vehicles already configured with a conventional cooling system, such as the cooling system 100 of FIG. 1. The shutoff valve 42 may be adapted to direct flow so that the coolant solution circulates through the interior heating circuit 20 and not the coolant mixing circuit when the shutoff valve 42 is actuated to a first position. When actuated to a second position, the shutoff valve may allow the coolant solution to flow through both the coolant mixing circuit 202 and the interior heating circuit 20. Alternatively, the second position of the shutoff valve may be configured to block flow through the heat exchanger and instead divert flow of the coolant solution to the reservoir 26.

Concentrated antifreeze may be added to the coolant solution at the reservoir 26, returning coolant solution with a higher antifreeze concentration to the interior heating circuit 20 downstream of the heat exchanger 22 and upstream of the electrically operated pump. The coolant solution flowing from the interior heating circuit 20 may enter the reservoir 26 and combine with the concentrated antifreeze. The coolant solution flowing out of the reservoir 26 may thus have a higher antifreeze concentration and may be circulated through the engine cooling circuit to provide a coolant solution with a depressed freezing point.

In one example, a controllable valve may be included in a coolant line between an outlet of the reservoir 26 and the interior heating circuit 20. The valve may be adapted to open when the shutoff valve 42 is actuated to the second position to allow coolant solution to flow to the reservoir 26 to mix with the concentrated antifreeze. In another example, the coolant line coupling the outlet of the reservoir 26 to the interior heating circuit 20 may not include a device to control flow. The reservoir 26 may be positioned vertically lower than the interior heating circuit 20 so that when the shutoff valve 20 is adjust to the first position to block flow through the coolant mixing circuit 202, concentrated antifreeze does not flow from the reservoir 26 to the interior heating circuit 20 due to gravity.

A default concentration of ethylene glycol in the coolant solution, e.g., an initial concentration of the coolant solution before adjustments to coolant concentration, included in the engine cooling circuit 10 and the vehicle interior heating circuit 20 of the cooling system 200 may include a 15% solution of ethylene glycol in water with additives. The reservoir 26, storing concentrated, aqueous antifreeze, may have a concentration of more than 95% ethylene glycol. When the shutoff valve is actuated to the second position and the coolant solution is flowed to the reservoir 26, the mixing of the more dilute coolant solution (with respect to antifreeze concentration) may maintain a level of fluid within the reservoir by replacing the concentrated antifreeze that is mixed and flowed to the interior heating circuit 20 with the coolant solution. The concentrated antifreeze in the reservoir 26 may become more dilute after events where increased antifreeze concentration in the coolant solution is desired.

Figure 3:
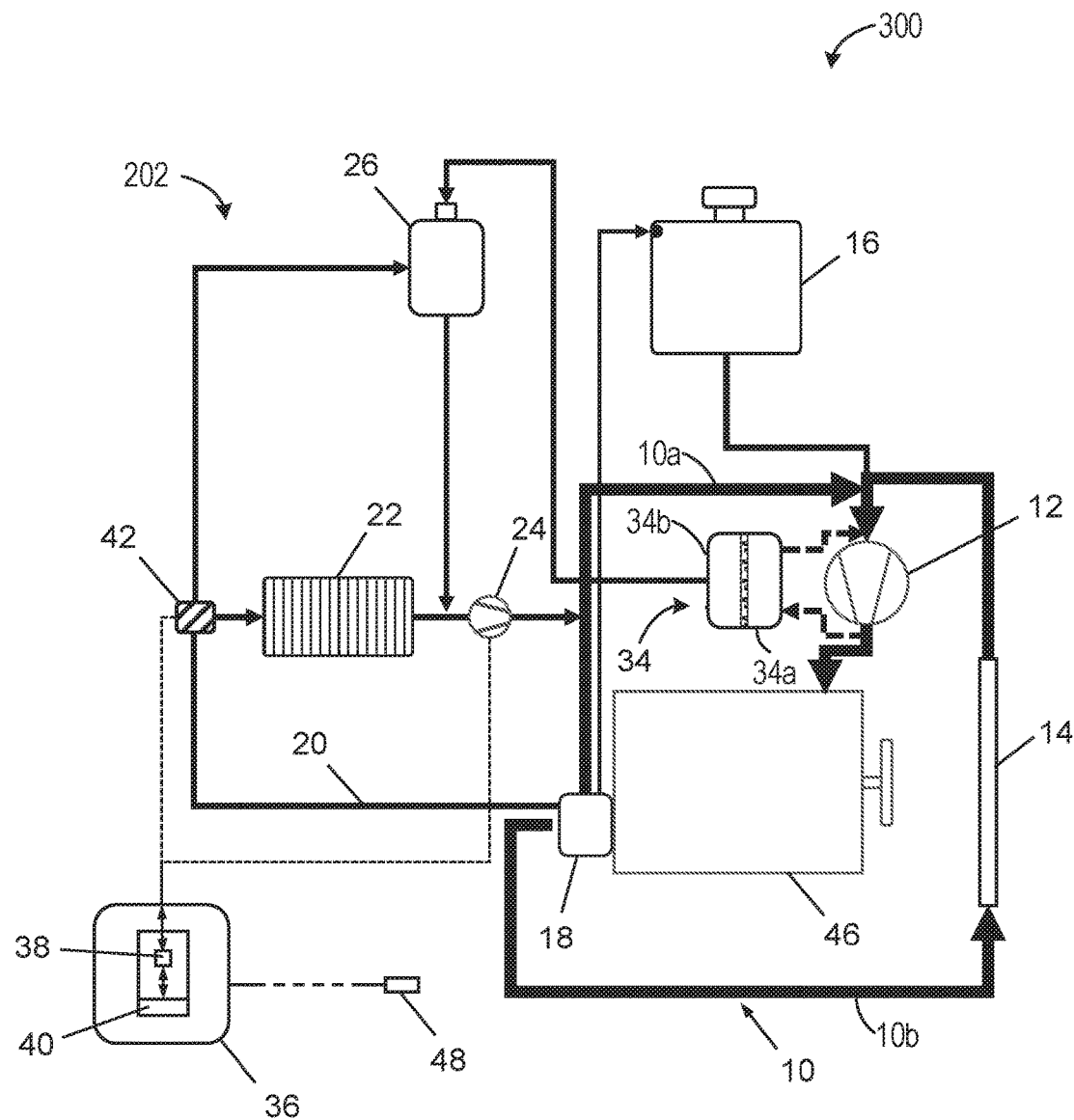
FIG. 3 shows a second embodiment of a cooling system in an engine adapted to produce a desired antifreeze concentration and configured with a separation tank.
Figure 4:
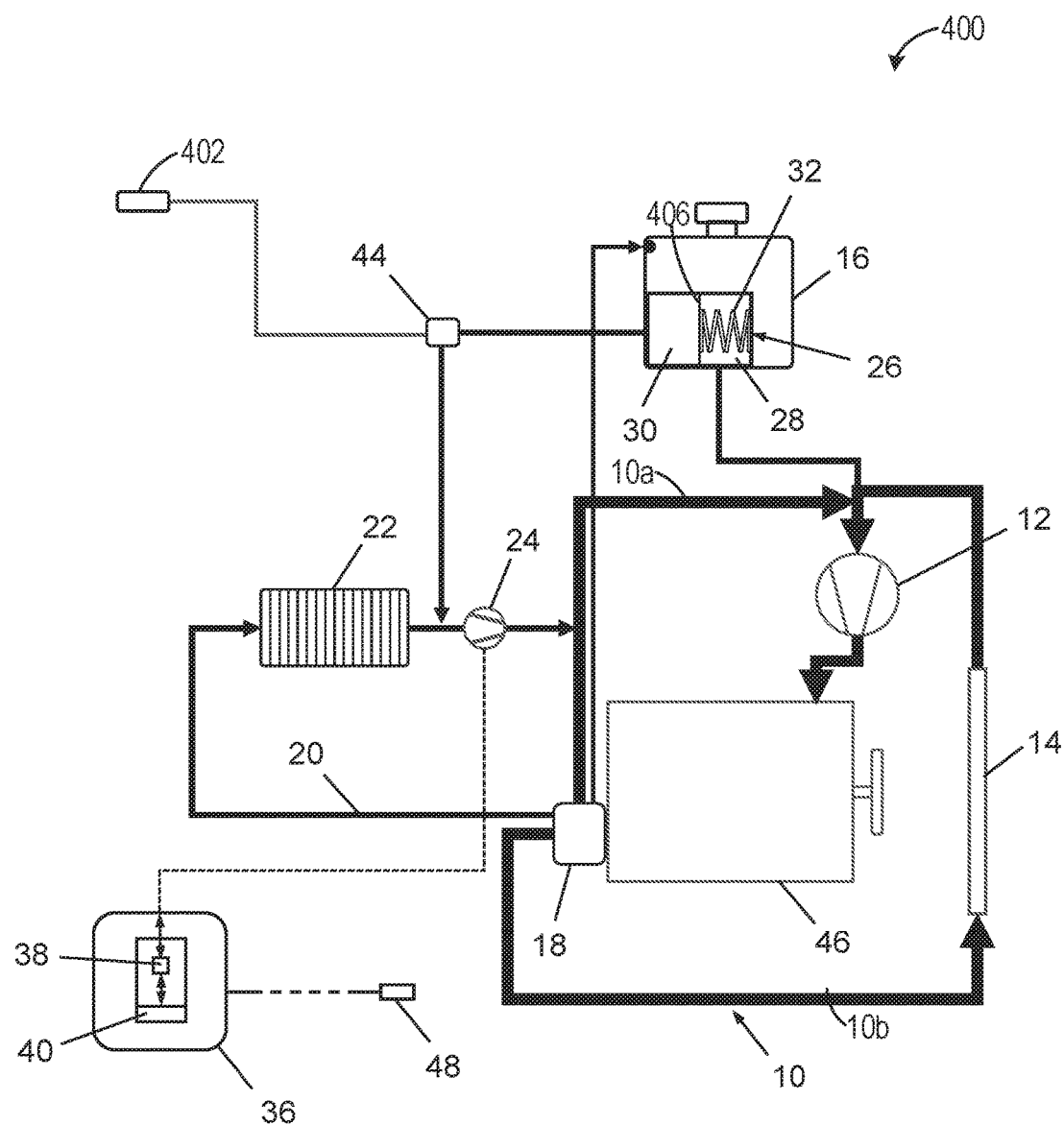
FIG. 4 shows a third embodiment of a cooling system in an engine adapted to produce a desired antifreeze concentration and configured with an integrated mixing unit.
Figure 5:
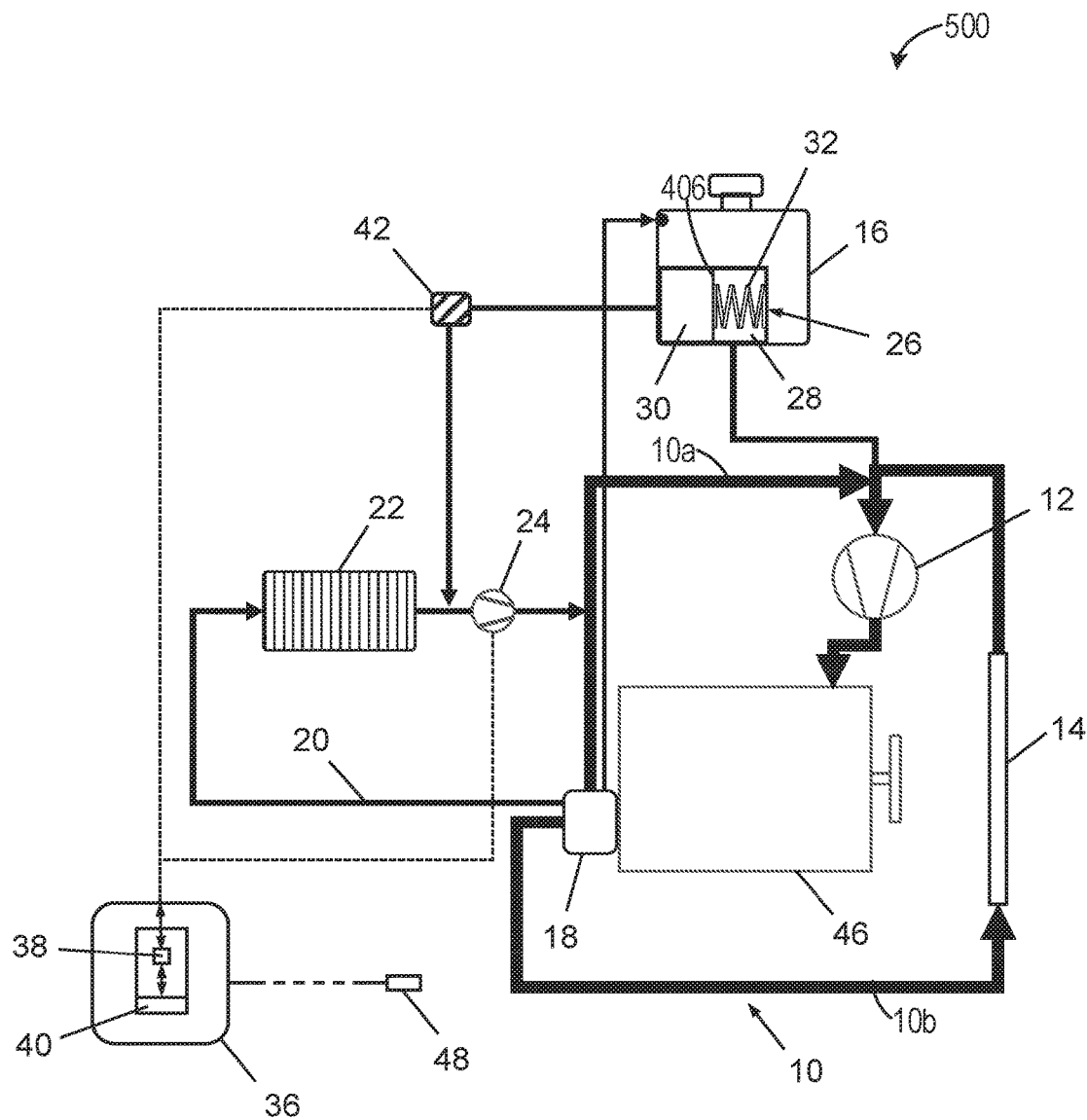
FIG. 5 shows a fourth embodiment of a cooling system in an engine adapted to produce a desired antifreeze concentration and configured with an integrated mixing unit and a variation in control of coolant flow to an interior heating circuit.
Figure 6:
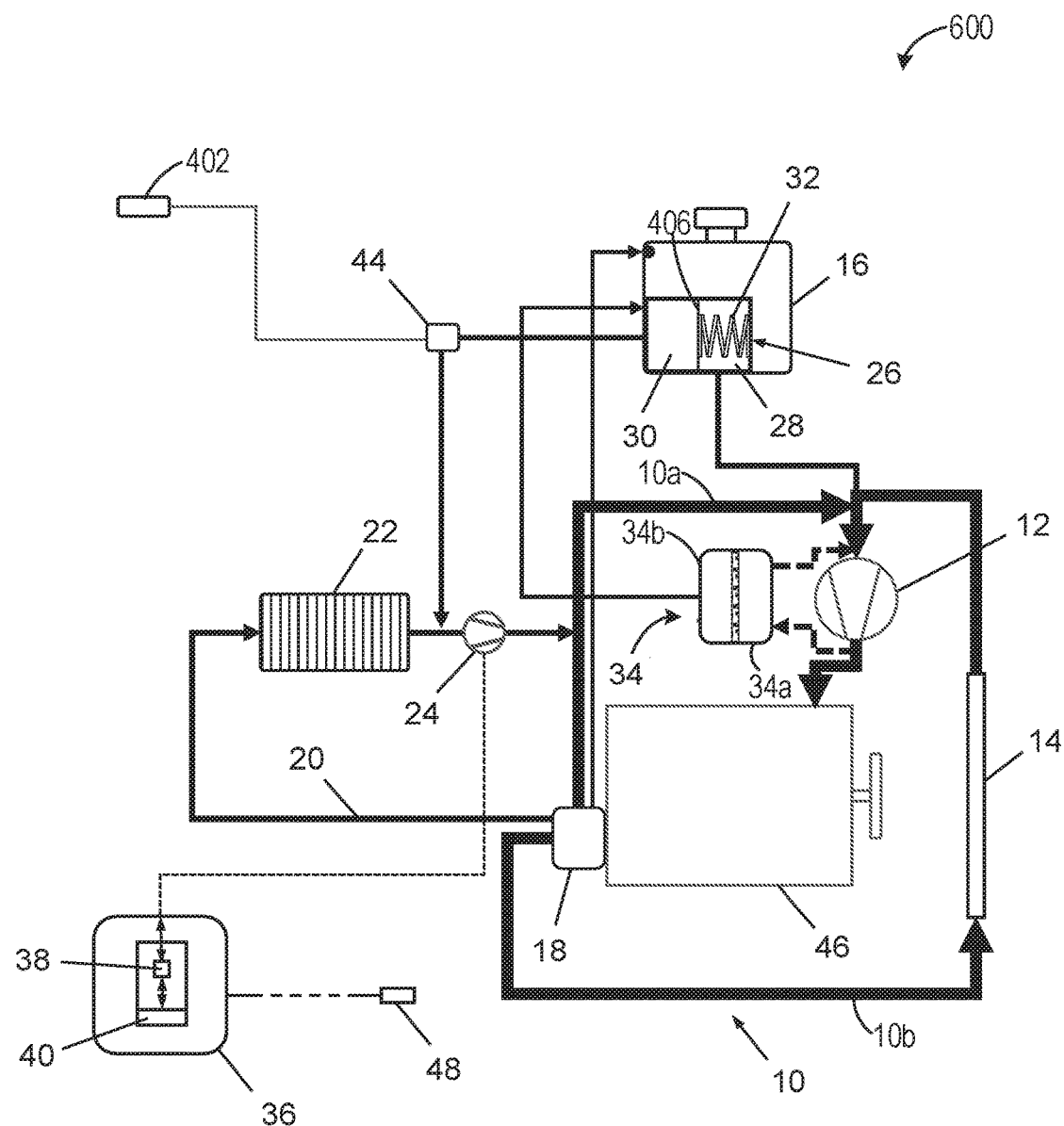
FIG. 6 shows a fifth embodiment of a cooling system in an engine adapted to produce a desired antifreeze concentration and configured with an integrated mixing unit and a separation tank.

The shutoff valve 42 may be a controllable valve, as shown in FIGS. 2, 3, 5, and 7, or a mechanical thermostatic valve, as shown in FIGS. 4 and 6. This may reduce a likelihood of degradation to engine components from freezing and expansion of the coolant solution as a result of inadequate actuation of the shutoff valve 42, e.g., due to operator misjudgment. In particular, when configured as a mechanical thermostatic valve, the shutoff valve may be adjust to the second position at a temperature slightly in excess of the freezing temperature of the coolants. For example, the temperature actuating the shutoff valve 42 to the second position may be set at approximately −4° C. for an antifreeze concentration of 10%.

The cooling system 200 may comprise the controllable shutoff valve 42 arranged in the flow path between the reservoir 26 and the vehicle interior heating circuit 20 where the coolant mixing circuit 202 couples to the interior heating circuit. The shutoff valve 42 may receive commands from the electronic control unit 36. The electronic control unit 36 comprises a processor unit 38 and a digital data storage unit 40, to which the processor unit 38 may have data access, and may be configured to actuate the shutoff valve 42 to fluidly couple the reservoir 26 and the vehicle interior heating circuit 20.

The electronic control unit 36 may control the shutoff valve 42 based on values of various input variables. Examples of the input variables may include an ambient temperature measured by an ambient temperature sensor 48, weather forecast information or also a manual input by an operator. The input variables may be received individually or in combination for actuation of the shutoff valve 42. However, the ambient temperature signal may have a greater effect on reducing degradation due to freezing and expansion of the antifreeze solution and may therefore be prioritized. By linking actuation of the shutoff element to determination of conditions, which combines one or more different input variables, as received by the electronic control unit 36, forecasting of changes in ambient temperature may be improved.

The electronic control unit 36 may be configured to control shutoff valve 42 in response to the input variables. For example, by inputting an anticipated decrease in ambient temperature, the antifreeze concentration may be increased in advance. This may be desirable if the vehicle is parked in a heated garage and a temperature outside of the garage is well below the freezing limit.

Actuation of shutoff valve 42 to the second position by the electronic control unit 36 may allow the antifreeze to circulate between the reservoir 26 and the vehicle interior heating circuit 20. In addition, the electronic control unit 36 may activate the electrically operated pump 24 in order to pump the coolant solution through the vehicle interior heat exchanger 20 to distribute the concentrated antifreeze from the reservoir 26 uniformly. After a predefined running time the electrically operated pump 24 may be switched off and the shutoff valve 42 closed. The duration of the running time may be adapted to provide a desired antifreeze concentration in the coolant solution based on known concentrations of antifreeze in the coolant solution and the concentrated antifreeze, known volumes of the coolant solution and concentrated antifreeze solution, and monitoring of change in volume of the concentrated antifreeze.

Over a period of time, the addition of concentrated antifreeze from the reservoir 26 to the cooling system 200 may lead to a concentration of antifreeze in the coolant solution that is undesirably high as well as a significant decrease in antifreeze concentration of the coolant solution stored in the reservoir 26. A replenishing or replacement of the coolant solution may occur during a service inspection or a change of vehicle tires from winter to summer tires at the end of a winter season. The coolant solution circulated through circuits of the cooling system 200 may be exchanged for a coolant solution with an antifreeze concentration of between 10-20% by volume to return the coolant solution to the default concentration. Concurrently, the reservoir 26 may be refilled with concentrated antifreeze. By returning the coolant solution to the default concentration, hydraulic losses at the water pump may be reduced. For example, a freezing point depression of the coolant solution may be provided at ambient temperatures down to approximately −5° C. with a 10% coolant solution (e.g. 10% antifreeze by volume) or down to −10° C. with a 20% coolant solution. With an antifreeze concentration of 20% by volume and an operating temperature of 100° C., a hydraulic pressure loss is increased by about 15% compared to pure water. In comparison, the conventional antifreeze concentration of 50%, imposes an increase in the hydraulic pressure loss of approximately 45-50%.

The cooling system 200 may allow the concentration of antifreeze in a coolant solution circulated through the engine cooling circuit 10 and the interior heating circuit 20 to be increased by actuating the shutoff valve 42 to the second position to add concentrated antifreeze from the reservoir 26 directly to the interior heating circuit 20. This may accommodate changes in an ambient temperature based on information from one or more inputs, including the temperature sensor 48, an anticipated change in ambient temperature communicated via a radio signal, or a manual switch. The configuration of the cooling system 200, however, may not be adapted to adjust the antifreeze concentration to reduce the antifreeze concentration in the coolant solution. A lower antifreeze concentration may be desired, for example, when ambient temperatures increase and a likelihood of the coolant solution freezing is decreased. Decreasing the antifreeze concentration may be achieved by configuring a cooling system with a separation unit, as shown in a second embodiment of a cooling system 300 shown in FIG. 3.

Separation of antifreeze from water in a coolant solution has been achieved conventionally by reverse osmosis, pervaporation or even distillation, which are also used in combination for the separation of water and ethylene glycol. These methods may impose additional energy demand due to increased temperature and increased pressure induced by the methods, which may be provided by the internal combustion engine (e.g., waste heat from exhaust gas and the cooling system). Any devices and mechanisms used for at least one of the separation methods described above may be installed within a separation unit 34 in a second embodiment of a cooling system 300 as shown in FIG. 3.

In this embodiment of the cooling system 300, as compared to the cooling system 200 of FIG. 2, a separation unit 34 may be included, arranged between the coolant pump 12 and the reservoir 26, for separating antifreeze out of the coolant solution in the engine cooling circuit 10. The separation unit 34 may be fluidly coupled on an inlet side 34a to the engine cooling circuit 10, e.g., in parallel with the coolant pump 12, and fluidly coupled on an outlet side 34b to the reservoir 26. The separation unit 34 may allow, after a flow connection has been established to the coolant pump 12, a reduction in the concentration of antifreeze in the coolant solution circulating through the engine cooling circuit 10, when ambient temperature rises. The coupling of the inlet side 34a of the separation unit 34 to the engine cooling circuit 10 may be provided, for example, by controllable shutoff valves (not shown), arranged between the separation unit 34 and the coolant pump 12 and actuated by the electronic control unit 36.

In this way, when the shutoff valves are open, in response to a detected increase in ambient temperature, and the shutoff valve 42 is adjusted to the first position, the coolant solution may pass through the separation unit 34 at the inlet side 34a. A portion of the antifreeze in the coolant solution may be extracted from the coolant solution via reverse osmosis, pervaporation, etc., into the outlet side 34b of the separation unit 34. The extracted antifreeze may be channeled to the reservoir 26 via a pump disposed in the outlet end 34b (not shown). The coolant solution that is circulated back to the engine cooling unit after passing through the inlet side 34a may therefore have a reduced concentration of antifreeze. The amount the antifreeze concentration is reduced may be adjusted by a duration of time that the coolant solution is passed through inlet side 34a the separation unit 34 with the shutoff valve open, and, additionally or optionally, a change in flow rate of the coolant solution controlled by the coolant pump 12.

If a decrease in ambient temperature is detected or anticipated, the antifreeze concentration in the coolant solution may be increased by closing the shutoff valves between the separation unit 34 and the engine cooling circuit 10 or maintaining the shutoff valves closed. The shutoff valve 42 may be adjusted to the second position or maintained in the second position and concentrated antifreeze may be added from the reservoir 26 via the coolant mixing circuit 202 to the interior heating circuit 20. The added antifreeze may then be mixed with the coolant solution and flowed to the engine cooling circuit 10 through the thermostat 18.

Turning now to FIG. 4, to reduce an amount of space occupied by elements of the cooling system, the reservoir 26 for holding the concentrated antifreeze may be arranged inside the expansion tank 16 in a third embodiment of a cooling system 400. In this way, an arrangement of the reservoir that occupies less space and reduces packaging of the cooling system is provided. In the cooling system 400, the reservoir 26 may still be fluidly coupled to the interior heating circuit 20 between the heat exchanger 22 and the electrically operated pump 24 but does not combine with the coolant solution before this merging point. The cooling system 400 may not include the shutoff valve 42 and instead comprise a second thermostatic valve 44 between the reservoir 26 and the merging point of flow from the reservoir 26 to the interior heating circuit 20.

Unlike the shutoff valve 42, the second thermostatic valve 44 may direct flow along a single direction and may be adjusted between an open position and a closed position. Alternatively, the second thermostatic valve 44 may be adjusted through a continuum of positions between the fully open and fully close positions. Actuation of the second thermostatic valve 44 may be based on a temperature measured by a remote temperature sensor 402 that detects ambient temperature. The remote temperature sensor may operate independently of the electronic control unit 36 and adjust the second thermostatic valve 44 directly. For example, the second thermostatic valve 44 may be configured to open and fluidly couple a second compartment 30 of the reservoir 26 to the vehicle interior heating circuit 20, if the remote temperature sensor 402 detects a temperature of −4° C. for an antifreeze concentration of 10% coolant.

The reservoir 26 may be positioned inside of the expansion tank 16 and contents of the reservoir, e.g., concentrated antifreeze and coolant solution, may not exchange with fluid contents, e.g., coolant solution, of the expansion tank 16. In other words, the reservoir 26 may be a sealed tank within the expansion tank 16. The reservoir 26 may comprise a first compartment 28 and the second compartment 30. Compartment 28 may be fluidly connected to the expansion tank 16. Inner volumes of first and the second compartments 28, 30 may be separated from one another by a movable, impermeable dividing wall 406. The first compartment 28 may be fluidly coupled to the engine cooling circuit 10, and the second compartment 30 may be configured to store the concentrated antifreeze. The second compartment 30 may be fluidly coupled to the vehicle interior heating circuit 20 with flow between the second compartment 30 and the interior heating circuit 20 controlled by the second thermostatic valve 44.

In one example, shown in FIG. 4, the movable dividing wall 406 may be adapted to be linearly displaceable. The moveable dividing wall 406 may move across the reservoir 26 while maintaining a vertical alignment and separation of the inner volumes of the first compartment 28 and second compartment 30. By moving across the reservoir while vertically aligned, the inner volumes of the first and second compartments 28, 30, may be proportionally adjusted. For example, when the moveable dividing wall 406 is moved towards the second compartment 30, e.g., to the left, the inner volume of the first compartment 28 is enlarged and the inner volume of the second compartment 30 is reduced. This may occur when the second thermostatic valve 44 is actuated to open and allow the concentrated antifreeze to flow to the vehicle interior heating circuit 20. Resistance to motion of the dividing wall 406 is thus reduced.

A stored energy element 32, which may be an elastic spring, may move the dividing wall 406 when enlargement of the first compartment 28 and reduction of the second compartment 30 is commanded, so that the concentrated antifreeze flows into the engine cooling circuit 10 via the vehicle interior heating circuit 20. There may be variation in the coolant filling level, since the volume which the concentrated antifreeze occupied before establishing of the flow connection is replaced by some of the coolant solution through the coupling of the first compartment 28 to the engine cooling circuit 10.

In an alternate embodiment of a cooling system 500 shown in FIG. 5, the cooling system 500 may be configured similarly to the cooling system 400 of FIG. 4, but with the shutoff valve 42 arranged between the second compartment 30 of the reservoir 26 and the interior heating circuit 20, instead of the second thermostatic valve 44. The shutoff valve 42 may receive commands from the electronic control unit 36 to adjust between the first and second positions based on ambient temperature, as detected by temperature sensor 48.

The embodiments of the cooling system 400 and 500 shown in FIGS. 4-5 may be adapted to increase the concentration of antifreeze in the coolant solution but not to decrease the concentration. A system for decreasing the antifreeze concentration may be incorporated into a cooling system 600 by including the separation unit 34, as illustrated in FIG. 6. In this example, the cooling system 600 is similar to the arrangement of the cooling system 400 of FIG. 4 but with an addition of the separation unit 34. The separation unit 34 may be positioned as shown in FIG. 3, coupled to the coolant pump 12 at the inlet side 34a, and to the reservoir 26 at the outlet side 34b. The separation unit 34 may be configured to separate antifreeze from the coolant mixture and return the antifreeze to the reservoir 26 by the methods described above.

In the cooling system 600, the reservoir tank 26 may be adapted with the first and second compartments 28 and 30, separated by the moveable dividing wall 406. The outlet side 34b may be directly coupled to the second compartment 30 of the reservoir 26. Concentrated antifreeze that is isolated from the coolant solution at the separation unit 34 may be driven by the coolant pump 12 to flow to the second compartment 30 of the reservoir 26. Pumping by the coolant pump 12 may overcome resistance due to the stored energy element 32 in the first compartment 28 to motion of the moveable dividing wall 406 towards the first compartment 28. The decrease in inner volume of the first compartment 28 as the volume of concentrated antifreeze increases in the second compartment 30 may cause in increase in flow rate of coolant solution from the first compartment 28 to the coolant pump 12. This may assist in generating a faster transition in the antifreeze concentration of the coolant solution to a more dilute coolant solution until a desired concentration is attained and the shutoff valves, e.g., valves controlling flow between the separation unit 34 and the engine cooling circuit 10, are closed. Furthermore, the second thermostatic valve 44 may be actuated to a position to block flow between the second compartment 30 of the reservoir 26 and the interior heating circuit 20, based on a detected increase in ambient temperature by the remote temperature sensor 402.

When an increase in antifreeze concentration of the coolant solution is desired, for example when ambient temperature is detected to decrease, the shutoff valve controlling flow between the separation unit 34 and the engine coolant circuit 10 may be closed (or maintained closed), and the second thermostatic valve 44 may be adjusted to allow flow of concentrated antifreeze from the second compartment 30 of the reservoir 26 to the interior heating circuit 20. The concentration of antifreeze in the circulating coolant solution increases, the inner volume of the second compartment 30 decreases while the inner volume of the first compartment 28 increases. Coolant solution from the engine cooling circuit 10 may flow to the first compartment 28 of the reservoir as the volume increases.

Figure 7:
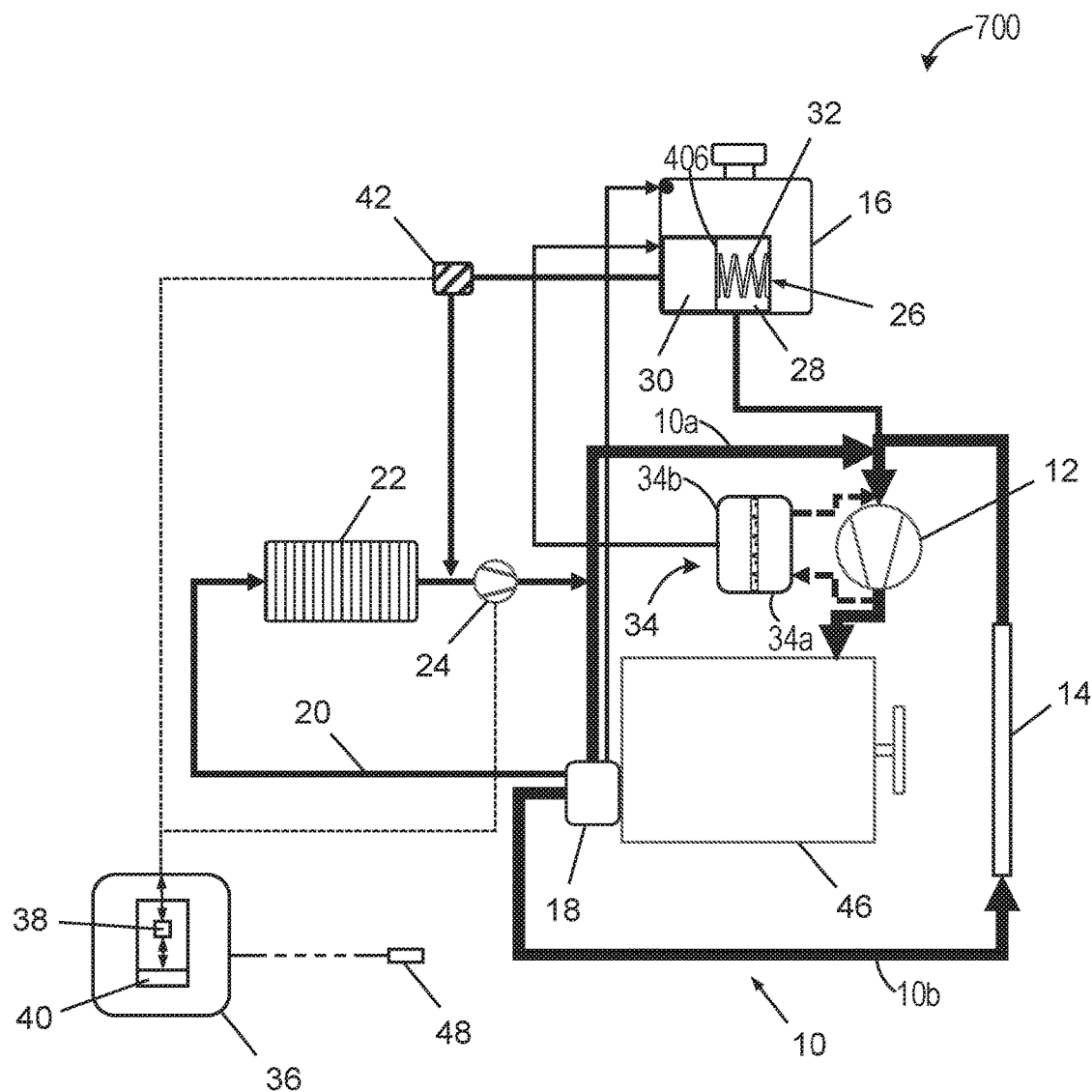
FIG. 7 shows a sixth embodiment of a cooling system in an engine adapted to produce a desired antifreeze concentration and configured with an integrated mixing unit, a separation tank, and a variation on control of coolant flow to an interior heating circuit.
Figure 8A:
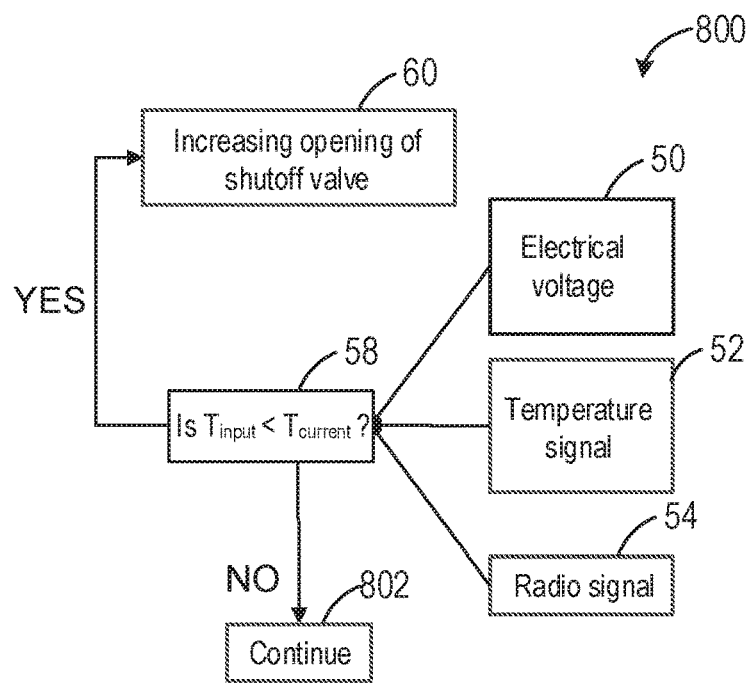
FIG. 8A shows a method for increasing a concentration of antifreeze in a coolant.

The addition of the separation unit 34 to a cooling system is also shown in FIG. 7. Therein, a cooling system 700 may be configured similarly to the cooling system 500 of FIG. 5, with the shutoff valve 42 arranged between the reservoir 26 and the interior heating circuit 20. The shutoff valve 42 may control flow of concentrated antifreeze from the second compartment 30 of the reservoir 26 to the interior heating circuit 20. The second compartment 30 may also be fluidly coupled to the outlet side 34b of the separation unit 34, receiving extracted antifreeze from the separation unit 34. As described above for the cooling system 600 of FIG. 6, the concentrated antifreeze may be pumped to the second compartment 30 by the coolant pump 12, overcoming resistance to the motion of the dividing wall 406 imparted by the stored energy element 32 in the first compartment 28 of the reservoir 26. As concentrated antifreeze is pumped into the second compartment 30, the dividing wall is shifted towards the first compartment 28, thereby increasing the inner volume of the second compartment 30, decreasing the inner volume of the first compartment 28, and increasing a flow of coolant solution from the first compartment 28 to the coolant pump 12 to be circulated through the engine cooling circuit 10 and interior heating circuit 20, as well as the separation unit 34, thereby diluting the coolant solution.

During a desired increase in antifreeze concentration of the coolant solution, a similar sequence of events as described for the cooling system 600 of FIG. 6 may occur. The shutoff valve controlling flow between the separation unit 34 and the engine coolant circuit may be closed (or maintained closed), and the shutoff valve 42 may be adjusted to the second position to flow concentrated antifreeze from the second compartment 30 of the reservoir 26 to the interior heating circuit 20. The concentration of antifreeze in the circulating coolant solution increases, the inner volume of the second compartment 30 decreases while the inner volume of the first compartment 28 increases. Coolant solution from the engine cooling circuit 10 may thus flow to the first compartment 28 of the reservoir as the volume increases.

Figure 8B:
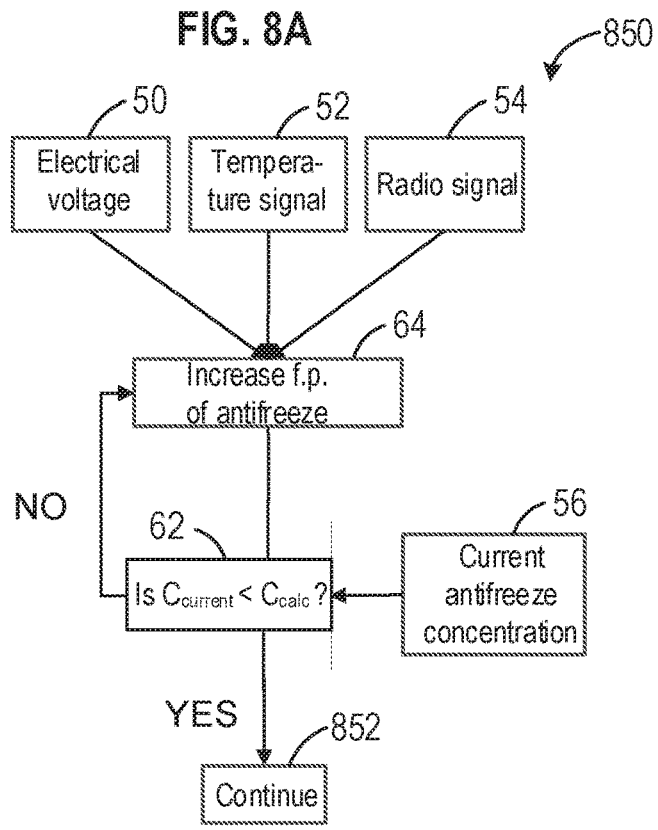
FIG. 8B shows a method for reducing a concentration of antifreeze in a coolant.
Figure 9:
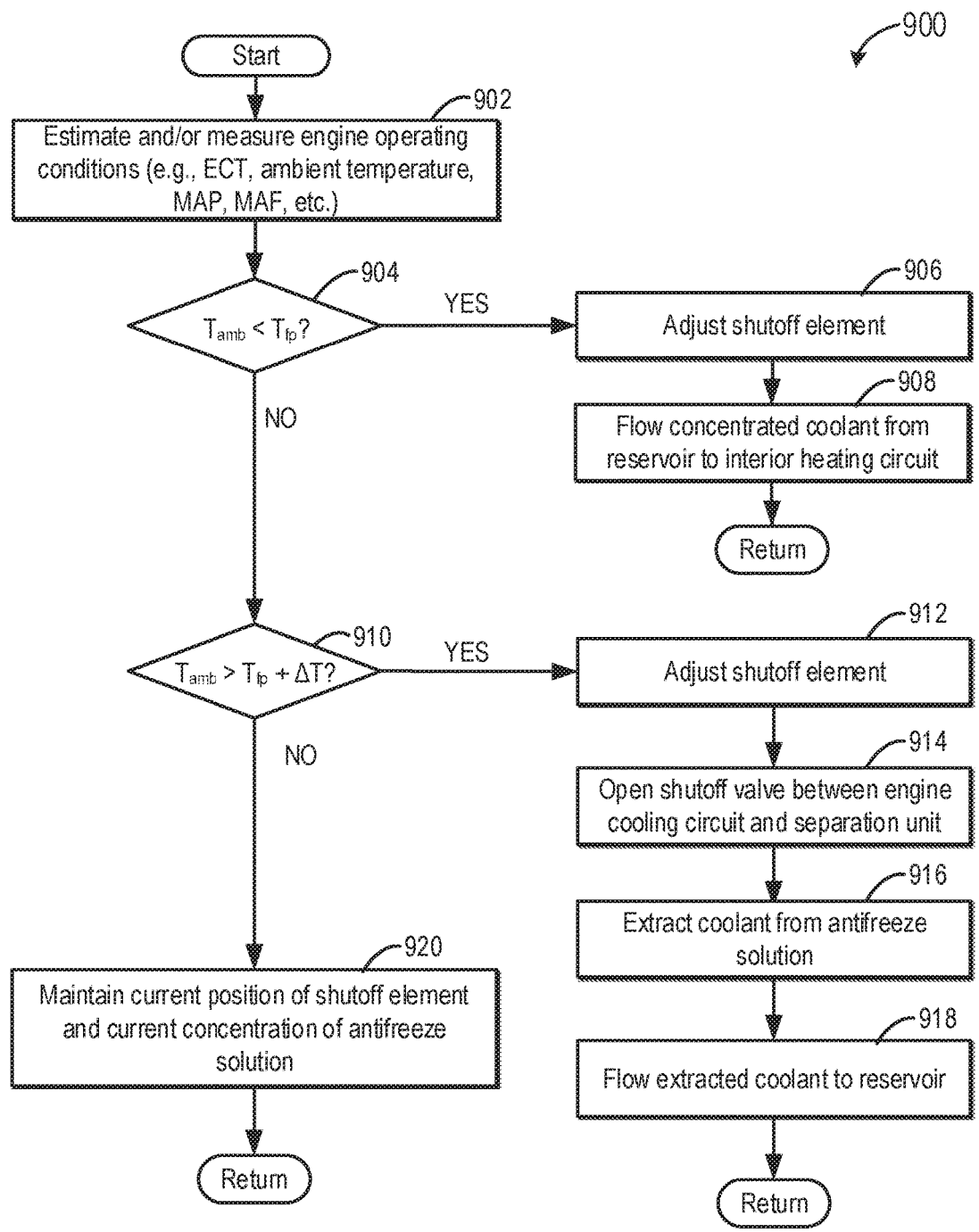
FIG. 9 shows an example routine for controlling a concentration of antifreeze in a coolant solution circulating through a cooling system.

Methods for increasing and decreasing coolant concentration in an antifreeze solution circulated through a cooling system, such as the embodiments of FIGS. 2-7, of a vehicle are shown in FIGS. 8A and 8B, respectively. In FIG. 8A, a method 800 is depicted, which may be used for a cooling system such as the cooling systems 200, 300, and 700 of FIGS. 2, 3, 5, and 7, to increase a concentration of antifreeze in a coolant solution. An electronic control unit, such as the electronic control unit 36 of FIGS. 2-7, may receive data from three input variables. The method includes a first input variable at 50 which may be an electrical voltage generated by an operator manually operating a switch element, e.g., turning a switch to an off or on position. The method includes a second input variable at 52, which may be a signal from an ambient temperature sensor of the vehicle, such as temperature sensor 48 of FIGS. 2-7. A third input variable, at 54, may be a radio signal transmitting a weather forecast, including a prediction of anticipated temperature values. The anticipated temperature values may be obtained for sources other than a radio signal in some examples, such as from GPS, Wi-Fi, etc.

The input variables at 50, 52, and 54 may be received individually or in combination in order to actuate a shutoff valve, such as the shutoff valve 42 of FIGS. 2, 3, 5, and 7. However, the ambient temperature signal may be prioritized over the forecasted temperature as well as the operator switch, since a response to ambient temperature may decrease a likelihood of degradation of engine components due to freezing of the antifreeze solution when the coolant concentration is not sufficiently high. At 58, the method includes determining if the predicted or measured ambient temperature, based on one or more of the input variables, is lower than the current temperature to which the antifreeze concentration in the coolant solution is adjusted. Alternatively, the method may use the ambient temperature signal exclusively.

If the temperature, based on one or more of the input variables, is not estimated to be less than the current operating ambient temperature, the method proceeds to 802 to continue flowing the coolant solution without adjusting the antifreeze concentration. If the temperature is determined to be less than the current operating temperature, the method continues to 60 to increase an opening of the shutoff element. By increasing the opening of the shutoff element, more concentrated antifreeze from a reservoir, such as the reservoir 26 of FIGS. 2-7, may be mixed with the coolant solution. The more concentrated coolant solution may be circulated through an interior heating circuit and into an engine cooling circuit. The coolant solution may flow through a first path of the engine cooling circuit, including a thermostatic valve, a coolant pump, and an engine when the thermostatic valve is in a first position and an engine coolant temperature (ECT) is detected to be below a threshold, such as 75° C. The coolant solution may flow through a second path of the engine cooling circuit, including the thermostatic valve, a radiator, the coolant pump and the engine when the thermostatic valve is adjusted into a second position when the ECT is above the threshold. Thus, the a freezing point of the coolant may be depressed when ambient temperatures decrease and increased cooling of the engine may be provided by increasing the opening of the shutoff valve.

A method 850 for decreasing a concentration of coolant in an antifreeze solution is shown in FIG. 8B for a cooling system such as the cooling systems 300, 600, and 700 of FIGS. 3, 6, and 7. The cooling system may include a separation unit, such as the separation unit 34 of FIGS. 3, 6, and 7, coupled to a coolant pump at an inlet end of the separation unit and coupled to a reservoir for concentrated coolant at an outlet end of the separation unit. The input variables 50, 52, and 54 may be a same set of input variables as in FIG. 8A, including the electrical voltage from an operator switch at 50, the ambient temperature signal 52, and the radio signal transmitting the forecasted weather at 54.

At 64, it is determined, based on the input variables, that a freezing point of the coolant solution may be raised. A thermostatic valve controlling flow of concentrated antifreeze from the reservoir to an interior heating circuit may be closed, such as the second thermostatic valve 44 of FIGS. 4 and 6, and an opening of a shutoff valve controlling flow of coolant solution from an engine cooling circuit to the separation unit may be increased. Antifreeze may be extracted from the coolant solution in the separation unit by a process such as reverse osmosis, pervaporation, or distillation, thereby decreasing the antifreeze concentration in the coolant solution.

The method continues to 62 where the electronic control unit may receive input from an inferred antifreeze concentration of the circulating coolant solution at 56. The concentration may be estimated based on measurement of a change in volume of concentrated antifreeze in the reservoir or calculated based on a flow rate of concentrated antifreeze added to an interior cooling circuit over a period time that a thermostatic valve controlling the flow is open. At 62, the method includes comparing the current concentration of antifreeze in the coolant solution to a concentration calculated to provide a desired freezing point of the coolant solution. If the current concentration is determined to be equal to or greater than the calculated concentration, the method proceeds to 852 to continue operation of the cooling system with the current concentration of antifreeze in the coolant solution. However, if the current concentration is determined to not be less than the calculated concentration, the method returns to 64 to increase the opening of the shutoff valve further and remove more antifreeze from the coolant solution via the separation unit.

As another example of a method 900 for adjusting an antifreeze concentration of a cooling system, such as the cooling systems of FIGS. 2-7, is shown in FIG. 9. The cooling system may include an engine cooling circuit, coupled to an interior heating circuit, and a reservoir containing concentrated antifreeze, e.g., ethylene glycol, fluidly coupled to the interior heating circuit. The reservoir may be arranged as an independent structure from other engine components or may be enclosed within an expansion tank that holds the coolant solution. Flow between the reservoir and the interior heating circuit may be adjusted by a shutoff element. Furthermore, the cooling system may include a separation unit, as shown in FIGS. 3, 6, and 7, that may extract antifreeze from a coolant solution, e.g., a mixture of ethylene glycol and water, circulated through the cooling system. Instructions for carrying out method 900 and the rest of the methods included herein may be executed by a controller, such as the electronic control unit of FIGS. 2-7, based on instructions stored on a memory of the controller and in conjunction with signals received from sensors of the engine system, such as the sensors described above with reference to FIGS. 2-7. The controller may employ engine actuators of the engine system to adjust engine operation, according to the methods described below.

At 902, the method includes estimating and/or measuring operating conditions of the engine. This may include, for example, determining an ambient temperature based on measurements from a temperature sensor such as temperature sensor 48 of FIGS. 2-7, determining an engine coolant temperature (ECT) from an ECT sensor at the engine block, an engine speed and load from a manifold absolute pressure (MAP) sensor and a manifold air flow (MAF) sensor positioned in an intake manifold, etc.

At 904, the method includes determining if the ambient temperature is measured or estimated to be lower than the freezing point of the coolant solution. The ambient temperature may be measured by a temperature sensor, as described above, or inferred based on a received radio signal transmitting a weather forecast and predicted temperature, for example. The freezing point of the coolant solution may be determined based on a pre-set initial concentration of antifreeze in the coolant solution and tracked changes in a volume of concentrated antifreeze in the reservoir. For example, during a flushing and refill event of the cooling system, e.g., after a winter season, the cooling system may be pre-loaded with a coolant solution of 15% antifreeze. The reservoir may be refilled with an 85% solution of antifreeze. The reservoir may be adapted with a sensor to detect fluid level changes in the reservoir which may be used to compute a volume of antifreeze added or subtracted from a known volume of coolant solution circulating through the cooling system. Thus, dilution or concentration of antifreeze in the coolant solution may be calculated by the controller to estimate a current concentration of antifreeze in the coolant solution. The concentration may be correlated to a freezing point of the coolant solution, according to a look-up table stored in the memory of the controller.

If the estimated or measured ambient temperature is determined to be lower than the freezing point of the coolant solution, the method proceeds to 906 to adjust the shutoff element so that the interior heating circuit and the reservoir are fluidly coupled. In one example, the shutoff element may be a controllable valve, adjustable between a first position that blocks flow from the interior heating circuit to the reservoir, and a second position that flows the coolant solution from the interior heating circuit to the reservoir. In another example, the shutoff element may be a mechanical thermostatic valve actuated by a remote temperature sensor, as shown in FIGS. 4 and 6, adjusted between an open position, allowing concentrated antifreeze to flow from the reservoir to the interior heating circuit, and a closed position blocking flow between the reservoir and the interior heating circuit. Concentrated antifreeze is flowed from the reservoir to the interior heating circuit at 908 and mixed with the coolant solution to increase the percentage of antifreeze in the solution. The method may return to 904 to again compare the estimated/measured ambient temperature with the calculated freezing point of the coolant solution.

As another example, the freezing point of the coolant solution may not be compared to an estimated or measured ambient temperature. Instead, adjustment of the shutoff element to add concentrated antifreeze to the interior heating circuit may be actuated based on an operator switch. For example, if the vehicle is parked in a heated garage and ambient temperatures are significantly colder, the operator may pre-emptively depress the freezing point of the coolant solution in anticipation of a rapid drop in ambient temperature when the vehicle exits the garage. Thus the antifreeze concentration of the coolant solution may be adjusted as desired by an operator by turning the switch on or off.

If the ambient temperature is not determined to be lower than the freezing point of the coolant solution, the method continues to 910 to determine whether the estimated/measured ambient temperature is higher than the freezing point of the coolant solution. It may also be determined if the ambient temperature is above the freezing point by a threshold ΔT, such as 5 or 50% higher as a threshold level for proceeding to 912. If the ambient temperature is estimated or measured to be higher than the freezing point of the coolant solution (or higher by the threshold), the method continues to 912.

At 912, the method includes adjusting the shutoff element, or maintaining the position of the shutoff element, and blocking flow of concentrated antifreeze from the reservoir to the interior heating circuit. A shutoff valve, positioned between the engine cooling circuit and the separation unit, may be actuated to open, or increasing an opening thereof, at 914, to allow coolant solution to flow from the engine cooling circuit into the separation unit. The separation unit may be configured to separate antifreeze from the coolant solution by methods such as reverse osmosis, pervaporation, distillation, etc. Antifreeze is extracted from the coolant solution at 916 and flowed to the reservoir at 918. Alternatively, the reduction in antifreeze concentration of the coolant solution may be activated by an operator switch. The method may return to 910 to again compare the estimated/measured ambient temperature to the freezing point of the coolant solution.

If the ambient temperature is not determined to be greater, or greater than a threshold, of the freezing point of the coolant solution, the method proceeds to 920 to maintain a current position of the shutoff element and flow the coolant solution at the current antifreeze concentration. The method may return to 904 to compare the estimated/measured ambient temperature to the freezing point of the coolant solution.

In this way a concentration of antifreeze in a coolant solution may be adjusted as the coolant solution is circulated through a cooling system. The amount of antifreeze in the coolant solution may be elevated to accommodate an anticipated or measured decrease in ambient temperature by adding concentrated antifreeze, stored in a reservoir, to the coolant solution. The antifreeze concentration may be decreased by flowing the coolant solution through a separation unit that extracts antifreeze from the coolant solution, returning the extracted antifreeze to the reservoir. The coolant solution may thus be adjusted to reduce a likelihood of the solution freezing and expanding upon freezing due to an insufficient concentration of antifreeze to depress the freezing point. The concentration may be decreased, thereby reducing a viscosity of the coolant solution and pump capacity for pumping the coolant solution, as well reducing a size of a heat exchanger, such as a radiator, and pipes/tubing through which the coolant solution flows. Furthermore, the reservoir may be positioned within an expansion tank containing the coolant solution, adapted with a movable dividing wall that separates a first compartment containing the coolant solution from a second compartment containing concentrated antifreeze. In this way, an amount of space occupied by the cooling system may be significantly decreased. The technical effect of adapting the cooling system with the reservoir of concentrated antifreeze and the separation unit is that coolant concentration may be adjusted to accommodate changes in ambient temperature.

As one embodiment, a cooling system of a vehicle engine includes an engine cooling circuit configured to flow a coolant solution, a vehicle interior heating circuit fluidly coupled to the engine cooling circuit, and a reservoir configured to store a concentrated antifreeze, the reservoir fluidly coupled to a shutoff element arranged in a flow path between the reservoir and the vehicle interior heating circuit, the shutoff element configured to adjust flow between the reservoir and the vehicle interior heating circuit in at least one operating state of the cooling system. In a first example of the cooling system, a separation unit for separates antifreeze out of the coolant solution of the engine cooling circuit, and the separation unit is fluidly coupled on an inlet side to the engine cooling circuit and on an outlet side to the reservoir. A second example of the cooling system optionally includes the first example and further includes wherein the reservoir is arranged inside an expansion tank of the cooling system. A third example of the cooling system optionally includes one or more of the first and second examples, and further includes, wherein the reservoir comprises a first compartment and a second compartment separated from one another by a movable dividing wall. A fourth example of the cooling system optionally includes one or more of the first through third examples, and further includes, wherein the first compartment is fluidly coupled to the engine cooling circuit and the second compartment is configured to store the concentrated antifreeze solution and is fluidly coupled to the vehicle interior heating circuit by the shutoff element. A fifth example of the cooling system optionally includes one or more of the first through fourth examples, and further includes, a stored energy element positioned in the first compartment and configured to move the dividing wall, so as to enlarge the first compartment and to reduce a size of the second compartment when antifreeze from the reservoir is flowed to the vehicle interior heating circuit through the shutoff element. A sixth example of the cooling system optionally includes one or more of the first through fifth examples, and further includes, wherein the shutoff element is a controllable valve. A seventh example of the cooling system optionally includes one or more of the first through sixth examples, and further includes, wherein the shutoff element is a mechanical thermostatic valve. An eighth example of the cooling system optionally includes one or more of the first through seventh examples, and further includes, further comprising an electronic control unit operable to actuate the shutoff element to flow concentrated coolant between the reservoir and the vehicle interior heating circuit. A ninth example of the cooling system optionally includes one or more of the first through eighth examples, and further includes, wherein the electronic control unit is operable to monitor a value of at least one input variable and to actuate the shutoff element if a monitored value of at least the one input variables fulfils a predefined condition. A tenth example of the cooling system optionally includes one or more of the first through ninth examples, and further includes, wherein before concentrated antifreeze is flowed between the reservoir and the vehicle interior heating circuit, the coolant solution has an antifreeze concentration of between 10% by volume and 20% by volume.

As another embodiment, a method for a cooling system of a vehicle includes selectively decreasing a concentration of antifreeze in a coolant solution circulating through the cooling system in response to a change in ambient temperature. In a first example of the method, selectively decreasing the concentration of antifreeze comprises flowing the coolant solution though a separation unit. A second example of the method optionally includes the first example, and further includes wherein flowing the coolant solution through the separation unit comprises opening one or more shutoff valves fluidly coupling the separation unit to the cooling system. A third example of the method optionally includes one or more of the first and second examples and further includes, flowing the coolant solution to the separation unit from an engine cooling circuit of the cooling system and returning the coolant solution with a decreased antifreeze concentration to the engine cooling circuit at an inlet end of the separation unit. A fourth example of the method optionally includes one or more of the first through third examples, and further includes, extracting antifreeze from the coolant solution in the separation unit, collecting the extracted antifreeze in an outlet end of the separation unit, and flowing the collected extracted antifreeze to a reservoir of the cooling system. A fifth example of the method optionally includes one or more of the first through fourth examples, and further includes, wherein decreasing the concentration of antifreeze in the coolant solution includes adjusting a shutoff element to block flow of the coolant solution from an interior heating circuit to the reservoir while opening the shutoff valves.

As another embodiment, a cooling system includes an engine cooling circuit configured to circulate a coolant solution through an engine, a vehicle interior heating circuit fluidly coupled to the engine cooling circuit, a separation unit adapted with a mechanism for extracting antifreeze from the coolant solution, the separation unit fluidly coupled to the engine cooling circuit at an inlet end of the separation unit, and a reservoir for storing concentrated antifreeze, the reservoir fluidly coupled to the separation unit at an outlet end of the separation unit and also fluidly coupled to the vehicle interior heating circuit. In a first example of the cooling system, a shutoff valve is positioned between the inlet end of the separation unit and the engine cooling circuit. A second example of the cooling system optionally includes the first example and further includes comprising a memory storing instructions executable by a processor to open the shutoff valve responsive to the ambient temperature increasing above a freezing point of the coolant solution.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cooling system of a vehicle engine, comprising;
an engine cooling circuit configured to flow a coolant solution;
a vehicle interior heating circuit fluidly coupled to the engine cooling circuit; and
a reservoir configured to store a concentrated antifreeze, the reservoir fluidly coupled to a shutoff element arranged in a flow path between the reservoir and the vehicle interior heating circuit, the shutoff element configured to adjust flow between the reservoir and the vehicle interior heating circuit in at least one operating state of the cooling system, the reservoir arranged inside an expansion tank of the cooling system.

2. The cooling system of claim 1, further comprising a separation unit for separating antifreeze out of the coolant solution of the engine cooling circuit, and wherein the separation unit is fluidly coupled on an inlet side to the engine cooling circuit and on an outlet side to the reservoir.

3. The cooling system of claim 1, wherein the reservoir comprises a first compartment and a second compartment separated from one another by a movable dividing wall.

4. The cooling system of claim 3, wherein the first compartment is fluidly coupled to the engine cooling circuit and the second compartment is configured to store the concentrated antifreeze solution and is fluidly coupled to the vehicle interior heating circuit by the shutoff element.

5. The cooling system of claim 3, further comprising a stored energy element positioned in the first compartment and configured to move the dividing wall, so as to enlarge the first compartment and to reduce a size of the second compartment when antifreeze from the reservoir is flowed to the vehicle interior heating circuit through the shutoff element.

6. The cooling system of claim 5, wherein the shutoff element is a controllable valve.

7. The cooling system of claim 5, wherein the shutoff element is a mechanical thermostatic valve.

8. The cooling system of claim 1, further comprising an electronic control unit operable to actuate the shutoff element to flow concentrated coolant between the reservoir and the vehicle interior heating circuit.

9. The cooling system of claim 8, wherein the electronic control unit is operable to monitor a value of at least one input variable and to actuate the shutoff element if the monitored value of the at least one input variables fulfils a predefined condition.

10. The cooling system of claim 1, wherein before concentrated antifreeze is flowed between the reservoir and the vehicle interior heating circuit, the coolant solution has an antifreeze concentration of between 10% by volume and 20% by volume.

11. A method for a cooling system of a vehicle, comprising;
decreasing a concentration of antifreeze in a coolant solution circulating through the cooling system in response to a change in ambient temperature, including decreasing the concentration of antifreeze in the coolant solution circulating from a coolant pump of the cooling system to an engine from a first concentration to a second concentration.

12. The method of claim 11, wherein decreasing the concentration of antifreeze comprises flowing the coolant solution though a separation unit.

13. The method of claim 12, wherein flowing the coolant solution through the separation unit comprises opening one or more shutoff valves fluidly coupling the separation unit to the cooling system.

14. The method of claim 13, further comprising flowing the coolant solution having the first concentration to the separation unit from a junction of the cooling system between the coolant pump and the engine and returning the coolant solution having the second concentration to the coolant pump.

15. The method of claim 14, further comprising extracting antifreeze from the coolant solution in the separation unit, collecting the extracted antifreeze in an outlet end of the separation unit, and flowing the collected extracted antifreeze to a reservoir of the cooling system.

16. The method of claim 15, wherein decreasing the concentration of antifreeze in the coolant solution includes adjusting a shutoff element to block flow of the coolant solution from an interior heating circuit to the reservoir while opening the one or more shutoff valves.

17. A cooling system, comprising;
- an engine cooling circuit configured to circulate a coolant solution through an engine;
- a vehicle interior heating circuit fluidly coupled to the engine cooling circuit;
- a separation unit adapted with a mechanism for extracting antifreeze from the coolant solution, the separation unit fluidly coupled to the engine cooling circuit at an inlet end of the separation unit; and
- a reservoir for storing concentrated antifreeze, the reservoir fluidly coupled to the separation unit at an outlet end of the separation unit and also fluidly coupled to the vehicle interior heating circuit, the concentrated antifreeze having a higher concentration of antifreeze than a concentration of antifreeze of the coolant solution.

18. The cooling system of claim 17, further comprising a shutoff valve positioned between the inlet end of the separation unit and the engine cooling circuit.

19. The cooling system of claim 18, further comprising a memory storing instructions executable by a processor to open the shutoff valve responsive to the ambient temperature increasing above a freezing point of the coolant solution.

* * * * *